US012738257B2

(12) United States Patent
Witt et al.

(10) Patent No.: US 12,738,257 B2
(45) Date of Patent: Sep. 15, 2026

(54) ACOUSTIC DAMPING MATERIAL WITH IMPROVED ADHESION AT LOW TEMPERATURES

(71) Applicant: SIKA TECHNOLOGY AG, Baar (CH)

(72) Inventors: Robert Witt, Rodgau (DE); Marko Vidovic, Frankenthal (DE); Frederick Schwab, Frankfurt (DE); Christian Hardt, Kelsterbach (DE); Jan Spengler, Breuberg (DE)

(73) Assignee: SIKA TECHNOLOGY AG, Baar (CH)

( * ) Notice: Subject to any disclaimer, the term of this patent is extended or adjusted under 35 U.S.C. 154(b) by 473 days.

(21) Appl. No.: 18/568,511

(22) PCT Filed: Jul. 5, 2022

(86) PCT No.: PCT/EP2022/068506
§ 371 (c)(1),
(2) Date: Dec. 8, 2023

(87) PCT Pub. No.: WO2023/280804
PCT Pub. Date: Jan. 12, 2023

(65) Prior Publication Data

US 2024/0290313 A1 Aug. 29, 2024

(30) Foreign Application Priority Data

Jul. 7, 2021 (EP) .................................... 21184352

(51) Int. Cl.

| | |
|---|---|
| ***G10K 11/168*** | (2006.01) |
| ***C09J 7/38*** | (2018.01) |
| ***C09J 11/08*** | (2006.01) |
| ***C09J 109/00*** | (2006.01) |

(52) U.S. Cl.
CPC ............... *G10K 11/168* (2013.01); *C09J 7/38* (2018.01); *C09J 11/08* (2013.01); *C09J 109/00* (2013.01); *C09J 2301/302* (2020.08); *C09J 2301/408* (2020.08)

(58) Field of Classification Search
CPC ..................................................... C09J 109/00
See application file for complete search history.

(56) References Cited

U.S. PATENT DOCUMENTS

| | | | |
|---|---|---|---|
| 6,361,643 | B2 | 3/2002 | Born et al. |
| 2017/0267842 | A1 | 9/2017 | Ohkubo et al. |

OTHER PUBLICATIONS

Nov. 4, 2022 International Search Report issued in International Patent Application No. PCT/EP2022/068506.
Nov. 4, 2022 Written Opinion issued in International Patent Application No. PCT/EP2022/068506.

*Primary Examiner* — Wenwen Cai
(74) *Attorney, Agent, or Firm* — Oliff PLC

(57) ABSTRACT

An acoustic damping material includes at least one polybutadiene PB, at least one at 25° C. liquid rubber LR, at least one butyl rubber BR, at least one natural or synthetic polyisoprene PI, at least one hydrocarbon resin HR and at least one solid particulate filler FM. The acoustic damping material is suitable for use in damping of undesired vibrations and noise in mechanical structures and components of manufactured articles. The acoustic damping material is used for damping of vibrations and noise in transportation vehicles and white goods, and a vibration and noise damping element include an adhesive layer composed of the acoustic damping material, and a method for applying a vibration and noise damping element to a noise emitting surface of a substrate, and a vibration damped system include a substrate and the vibration and noise damping element bonded to a noise emitting surface of the substrate.

15 Claims, 2 Drawing Sheets

ACOUSTIC DAMPING MATERIAL WITH IMPROVED ADHESION AT LOW TEMPERATURES

TECHNICAL FIELD

The present invention relates to compositions used for damping of vibrations and noise in mechanical structures of manufactured articles. In particular, the present invention relates compositions, which are suitable for use in damping of vibrations of components and structures contained in articles of automotive industry, home appliances, and general industry.

BACKGROUND OF THE INVENTION

Acoustic damping materials are widely used in automotive, home appliance and general industries for reducing of undesired vibrations, structure borne noise, and air borne noise. For example, in automotive vehicles, it is desirable to prevent transfer of vibrations generated by the motors, pumps, gears and other dynamic force generators through the body of the vehicle into the passenger compartment. Structure borne noise is produced when the vibrations generated by a dynamic force generator are transmitted through a supporting structure, typically a frame or other hollow structure, to a noise emitting surface, such as a metallic or plastic panel, which transforms the mechanical vibrations into sound waves. Structure borne noise and vibrations in general can be effectively reduced by application of vibration damping materials directly to the structures and surfaces of components subjected to vibrational disturbances, such as surfaces of vehicle panels, floors, and shells of machines, washers, and dryers.

Acoustic damping materials used for damping of vibrations of panels and plates are commonly provided in form of pre-formed single- and multi-layer damping elements or as liquid compositions, which are applied directly on surface of a substrate. Damping materials designed for damping of vibrations and noise in hollow structures such as cavities are usually provided in form of cavity filler inserts comprising an expandable composition and one or more attaching members, which are capable of holding the cavity filler insert in a desired position within the hollow structure.

Pre-formed single- and multiple-layer damping elements comprise a damping layer, which is in direct contact with a surface of the substrate to be damped against vibrational disturbances. The damping layer is capable of dissipating kinetic energy of the vibrating surface into heat energy through extension and compression of the material of the damping layer. Widely used materials for damping layers include bitumen- and rubber-based compositions comprising relatively high amounts of particulate fillers and varying amount of additives, in particular plasticizers, rheology modifiers, and drying agents. Pre-formed single- and multiple-layer damping elements often comprise a layer of an adhesive composition, such as a pressure sensitive adhesive (PSA) or a hot-melt adhesive, to enable bonding of the damping layer to a surface of a substrate, such as a panel or floor of an automotive vehicle. Liquid applied damping systems are typically thermally drying, gelling, or reactive compositions, which are applied on the surface of the substrate in liquid state, for example by spraying.

Acoustic damping materials used for damping of vibrations of panels and plates can also be provided in form of constrained layer damping elements, which contain a damping layer and a stiff outer layer that "constraints" the damping layer thereby sandwiching it between the stiff outer layer and the surface of the substrate to be damped. The stiffness of the outer layer is generally a factor of ten times higher than the stiffness of the layer of damping material. Commonly used materials for the outer top layer include, for example, aluminum and fiber glass fabrics. Constrained layer dampers are typically more effective in damping of undesired vibrations than single-layer damping elements but they are also more expensive to produce.

Cavity filler inserts are used for damping of air borne noise within the cavity of a hollow structure component and to prevent vibrations from being transmitted through the walls of the cavity. A cavity filler insert typically consists of a damping material and at least one attachment member capable of holding the cavity filler insert in a desired position within the hollow structure. The damping material of the cavity filler insert is typically formulated as an expandable composition, which upon activation, such as at elevated temperature, expands and forms a seal around the interior surface of the wall of the cavity. Expandable damping materials suitable for damping of air borne noise within a cavity are commonly referred to as "acoustic baffles".

Bitumen-based compositions have been widely used as acoustic damping materials in the automotive and home appliance industry, since these are low cost materials with high vibration damping properties as well as reliable and easily controllable physical properties. In the home appliance market, bitumen based damping systems currently have almost 100% market share. Highly filled bitumen compositions have been in particular used for providing sound proofing coverings and anti-drumming coatings, which are applied to metal and plastic components in assembly processes of automotive vehicles and household appliances. According to a conventional procedure, a mixture of bitumen and fillers is first extruded and/or calendered to form films, from which suitable shaped parts suitable for use as damping elements are prepared by punch or die cutting. The damping elements are then bonded to the metal or plastic sheet to be damped. It is also possible that the shaped part is further adapted to the shape of the metal or plastic sheet by heating.

US 2017267842 A1 discloses a thermally curable composition, comprising solid rubber, olefinic double bond-containing polymers, hydrocarbon, liquid polydiene and a vulcanization system and the use thereof as acoustically attenuating material in vehicles. Also disclosed is a process for applying the composition by injecting it by a pump to a point of application at a temperature in a range of 15 to 60° C. and deposition in a liquid or pasty state onto a substrate.

U.S. Pat. No. 6,361,643 B2 discloses a one-component, heat-curing reactive compositions based on liquid rubbers containing reactive olefinic double bonds and optionally solid rubbers and vulcanization systems based on sulfur have high maxima of the acoustic loss factor over a broad in-use temperature range of around +10° C. to +40° C. in their vulcanized state. These compositions optionally contain fine-particle thermoplastic polymers as an additional component. The compositions are suitable for use as acoustically damping adhesives, sealing compounds or coating compositions.

One of the main application areas of acoustic damping elements includes the interior of automotive vehicles and washing machines in home appliances. In these applications, the acoustic damping materials are subjected to exposure to low temperatures, especially in the case of automotive vehicles. In the automotive industry, the quality and performance at low temperature of around −20 to −40° C. of the components used in automotive vehicles is controlled by the car producers. For example, the ball drop test at −30° C. is used to assess the adhesion of the acoustic damping elements in the cold. The classical material for use in automotive and white good applications have the disadvantage of a low performance in the ball drop test at low temperatures, especially at −30° C.

There is thus a need for a novel type of acoustic damping material, which shows good performance in the ball drop test at low temperatures, especially at −30° C., preferably has a good adhesion to the substrate it is applied to and provides similar or improved vibration and noise damping properties compared to the State-of-the-Art rubber-based damping materials.

SUMMARY OF THE INVENTION

The object of the present invention is to provide a material for use in damping of undesired vibrations and noise in mechanical structures and components of manufactured articles, which material also has improved performance in the ball drop test at low temperatures, especially at −30° C., compared to State-of-the-Art rubber-based acoustic damping materials.

The subject of the present invention is an acoustic damping material.

It was surprisingly found out that the acoustic damping material according to the invention exhibits similar or even improved vibration and noise damping properties compared to commercially available rubber-based acoustic damping materials. In particular, it was found out that the acoustic damping material of the present invention exhibits a high vibration damping performance as defined by the loss factor at temperatures around 10-20° C., which makes it especially suitable for use in damping of vibrations and noise of structures and components of automotive vehicles.

Other subjects of the present invention are presented in other independent claims. Preferred aspects of the invention are presented in the dependent claims.

DETAILED DESCRIPTION OF THE INVENTION

Figure 1:
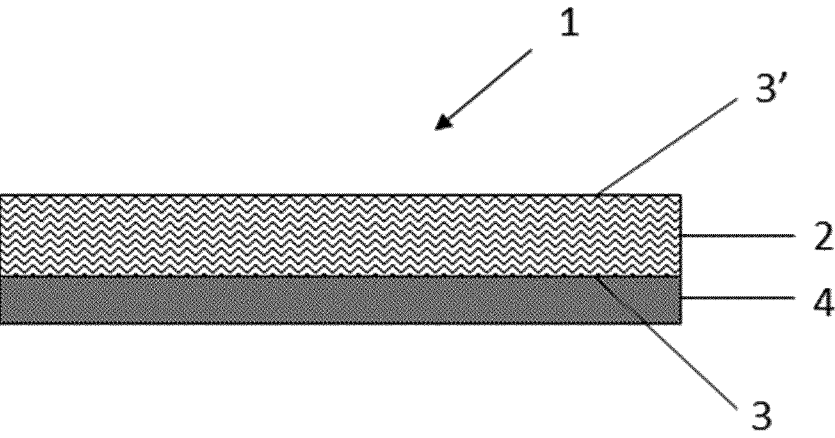
FIG. 1 shows a cross-section of a vibration and noise damping element (1) comprising a damping layer (2) having a first surface (3) and a second surface (3'), and an adhesive layer (4) covering the first surface (3) of the damping layer (2).

The subject of the present invention is an acoustic damping material comprising:

a) ≥0.75 wt.-%, based on the total weight of the acoustic damping material, of at least one polybutadiene PB comprising monomer units derived from 1,3-butadiene (I)

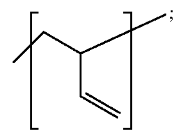

;

(II)

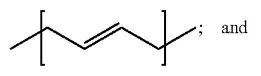

; and (III)

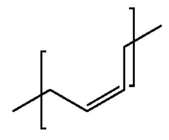

wherein the proportion of monomer units of the formula (I) in the entirety of the monomer units derived from 1,3-butadiene present in the polybutadiene is 25 to 75 mole percent, the proportion of units of the formula (II) in the entirety of the monomer units derived from 1,3-butadiene present in the polybutadiene is 0 to 10 mole percent and the proportion of monomer units of the formula (III) in the entirety of the monomer units derived from 1,3-butadiene present in the polybutadiene is 25 to 75 mole percent, wherein the entirety of the monomer units (I), (II) and (III) add up to 100 mole percent, and the polybutadiene preferably has an average molecular weight of 1000 to 4000 g/mol;

b) ≥10 wt.-%, based on the total weight of the acoustic damping material, of at least one at 25° C. liquid rubber LR selected from the group consisting of at 25° C. liquid polybutenes and at 25° C. liquid polyisobutylenes, preferably at 25° C. liquid polyisobutylenes;

c) ≥3 wt.-%, based on the total weight of the acoustic damping material, of at least one butyl rubber BR;

d) ≥3 wt.-%, based on the total weight of the acoustic damping material, of at least one natural or synthetic polyisoprene PI, preferably natural polyisoprene, most preferably natural rubber;

e) 4-15 wt.-%, based on the total weight of the acoustic damping material, of at least one hydrocarbon resin HR;

f) at least one solid particulate filler FM.

Substance names beginning with "poly" designate substances which formally contain, per molecule, two or more of the functional groups occurring in their names. For instance, a polyol refers to a compound having at least two hydroxyl groups. A polyether refers to a compound having at least two ether groups.

The term "polymer" refers to a collective of chemically uniform macromolecules produced by a polyreaction (polymerization, polyaddition, polycondensation) where the macromolecules differ with respect to their degree of polymerization, molecular weight and chain length. The term also comprises derivatives of said collective of macromolecules resulting from polyreactions, that is, compounds which are obtained by reactions such as, for example, additions or substitutions, of functional groups in predetermined macromolecules and which may be chemically uniform or chemically non-uniform.

The term "molecular weight" refers to the molar mass (g/mol) of a molecule or a part of a molecule, also referred to as "moiety". The term "average molecular weight" refers to number average molecular weight (Mn) of an oligomeric or polymeric mixture of molecules or moieties. The molecular weight can be determined by conventional methods, preferably by gel permeation-chromatography (GPC) using polystyrene as standard, styrene-divinylbenzene gel with porosity of 100 Angstrom, 1000 Angstrom and 10000 Angstrom as the column and depending on the molecule, tetrahydrofurane as a solvent, at a temperature of 35° C. or 1,2,4-trichlorobenzene as a solvent, at 160° C.

The term "glass transition temperature" ($T_g$) refers to the temperature above which temperature a polymer component becomes soft and pliable, and below which it becomes hard and glassy. The glass transition temperature ($T_g$) is preferably determined by dynamical mechanical analysis (DMA) as the peak of the measured loss modulus (G") curve using an applied frequency of 1 Hz and a strain level of 0.1%.

The term "softening point" refers to a temperature at which compound softens in a rubber-like state, or a temperature at which the crystalline portion within the compound melts. The softening point can be determined by Ring and Ball measurement conducted according to DIN EN 1238 standard.

The term "room temperature" designates a temperature of 23° C.

The acoustic damping material of the present invention is especially suitable for use in damping of undesired vibrations and noise in mechanical structures components of a manufactured article, such as an automotive vehicle or a product of home appliance or general industry. In these applications, the acoustic damping material, typically provided in form of a shaped article, such as a layer or pad, is applied directly on a surface a mechanical structure or component, which is subjected to vibrational disturbances. The acoustic damping material can be brought to a form of a suitably shaped article by using conventional extrusion and/or calendaring or hot-pressing techniques. The type and amount of the components a) to f) of the acoustic damping material can be optimized such that that the efficiency of the material in dissipating kinetic energy of the vibrating surface into heat energy through extension and compression of the damping material is maximized in the application relevant temperature range.

The acoustic damping material of the present invention is preferably essentially free of bitumen. The expression "essentially free" is understood to mean that the acoustic damping may contain only traces of bitumen, such as less than 0.5 wt.-%, preferably less than 0.25 wt.-%, more preferably less than 0.1 wt.-%, still more preferably less than 0.01 wt.-%, based on the total weight of the acoustic damping material. The term "bitumen" designates in the present disclosure blends of heavy hydrocarbons, having a solid consistency at room temperature. These are normally obtained as vacuum residue from refinery processes, which can be distillation (topping or vacuum) and/or conversion processes, such as thermal cracking and visbreaking, of suitable crude oils.

Furthermore, the term "bitumen" also designates natural and synthetic bitumen as well as bituminous materials obtained from the extraction of tars and bituminous sands.

Furthermore, it may be preferably that the acoustic damping material is substantially free of cross-linking/curing agents, such as free-radical cross-linking agents, for example peroxides. The phrase "substantially free" is intended to mean that if an amount of a cross-linking agent is found in the acoustic damping material, said amount is so negligible that the effect of the cross-linking agent cannot be obtained. In other words, the amount of a cross-linking agent found in the acoustic damping material cannot initiate curing of the polymeric components or can initiate only a substantially negligible amount of cross-linking. According to one or more embodiments, the acoustic damping material contains less than 0.15 wt.-%, preferably less than 0.1 wt.-%, more preferably less than 0.01 wt.-%, even more preferably 0 wt.-%, based on the total weight of the acoustic damping material, of cross-linking/curing agents.

The acoustic damping material comprises 0.75 wt.-%, based on the total weight of the acoustic damping material, of at least one polybutadiene PB comprising monomer units derived from 1,3-butadiene (I)

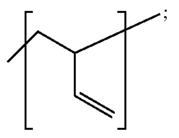

;

(II)

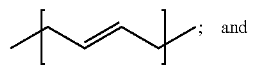

; and (III)

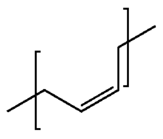

wherein the proportion of units of the formula (I) in the entirety of the monomer units derived from 1,3-butadiene present in the polybutadiene is 25 to 75 mole percent, preferably 50 to 65 mole percent and preferably 59 to 62 mole percent, the proportion of units of the formula (II) in the entirety of the monomer units derived from 1,3-butadiene present in the polybutadiene is 0 to 10 mole percent, preferably 1 to 8 mole percent and preferably 2 to 6 mole percent, and the proportion of units of the formula (III) in the entirety of the monomer units derived from 1,3-butadiene present in the polybutadiene is 25 to 75 mole percent, preferably 25 to 40 mole percent and preferably 35 to 39 mole percent, with the proviso that the entirety of all monomer units (I), (II) and (III) add up to 100 mole percent, and the polybutadiene preferably has an average molecular weight of 1000 to 4000 g/mol, preferably 1200 to 3500 g/mol and preferably 1500 to 3000 g/mol.

In the context of the present invention, the term "polybutadiene" is to be understood as meaning a product obtainable by polymerization of monomer units each having at least two conjugated double bonds, wherein, in order of increasing preference, at least 80%, preferably at least 85%, preferably at least 90%, preferably at least 95%, preferably at least 98%, preferably at least 99%, most preferably at least 99.9% of the monomer units, preferably exclusively, are 1,3-butadiene. Possible further compounds (impurities) may be, e.g. alkanes or alkenes having 3 to 5 carbon atoms, in particular propene, 1-butene or 1,2-butadiene.

It was surprisingly found that an amount of less than 0.75 wt.-% leads to insufficient ball drop test at low temperatures performance. This can be seen in the comparison of Ref.1-3 with E1-E5.

Preferably, the amount of the at least one polybutadiene PB is 1-15 wt.-%, preferably 1.2-10 wt.-%, preferably 1.3-8 wt.-%, preferably 1.5-7 wt.-%, preferably 1.5-5 wt.-%, most preferably 1.5-3 wt.-%, based on the total weight of the acoustic damping material. This is advantageous with respect to good ball drop test at low temperatures performance, high adhesion values and a cohesive fracture pattern. This can be seen in the comparison of Ref.3 with E1-E5.

In the monomer units shown with the formulae (I), (II) and (II), where a square bracket in the formula representation chosen in this application shows the monomer units (I), (II) and (II) derived from 1,3-butadiene present in the polybutadiene, the bonds marked with the respective square bracket do not end with a methyl group, for instance; instead, the relevant monomer units are bonded via this bond to another monomer unit. The monomer units (I), (II) and (III) may be arranged in the polymer in any desired sequence in this case. A random arrangement is preferred.

The proportion of the monomer units in the polybutadiene PB, which do not conform to any of the formulae (I), (II) or (III), is preferably less than 20 mole percent, preferably less than 5 mole percent, particularly preferably less than 1 mole percent and especially preferably less than 0.1 mole percent, based on the entirety of the monomer units. The proportion of the monomer units in the polybutadiene PB, which do not conform to any of the formulae (I), (II) or (III), may be controlled in the production process by using 1,3-butadiene which accordingly comprises preferably less than 20 mole percent, preferably less than 5 mole percent, particularly preferably less than 1 mole percent and especially preferably less than 0.1 mole percent of impurities, particularly of dienes which are not 1,3-butadiene.

The molar proportions of the monomer units according to the formulae (I), (II) and (III) are preferably determined by IR spectroscopy relative to polybutadiene standards. For this purpose, the samples (ca. 80 to 250 mg) are dissolved in 10 ml of carbon disulfide ($CS_2$). In the case of high vinyl content low concentrations are used and at high cis content higher concentrations are used. The measurements are carried out in IR cuvettes with NaCl windows and 0.5 mm path length. The solvent is subtracted, and the spectrum is shown as absorbance in the evaluation range 1100 to 600 $cm^{-1}$. At absorbances above 1, the measurement is repeated with a lower concentration. The absorbances above baselines of the following signals are determined:

trans-1,4-polybutadiene: 968 $cm^{-1}$ 1,2-polybutadiene: 911 $cm^{-1}$ cis-1,4-polybutadiene: 730 $cm^{-1}$ The molar proportions of the monomer components are preferably given by $$\% \text{ comp}(i)=Ext(i)*100\%/(E(i)*c*d*)$$

where

Ext(i)=absorbance above baseline

E(i)=extinction coefficient (substance specific, to be determined by calibration)

[E]=L/(g*cm)

d=path length of the cuvette in cm c=concentration of the sample in g/L

The polybutadiene PB preferably has a viscosity at 20° C. of 2000 to 8000 mPa*s, preferably of 3000 to 7000 mPa*s. This viscosity (cone-plate) is preferably determined according to DIN 53018 with a Rheometer Physica MCR 301 from ANTON PAAR Germany GmbH.

It may be advantageous if the polybutadiene PB has a dispersity of 2.1 to 3.0.

The dispersity is defined as number-average molar mass (Mn) divided by weight-average molar mass (Mw).

Particularly preferred polybutadiene PB are those in which the proportion of units of the formula (I) in the entirety of the monomer units derived from 1,3-butadiene present in the polybutadiene is 50 to 65 mole percent and preferably 59 to 62 mole percent, the proportion of units of the formula (II) in the entirety of the monomer units derived from 1,3-butadiene present in the polybutadiene is 1 to 8 mole percent and preferably 2 to 6 mole percent, and the proportion of units of the formula (III) in the entirety of the monomer units derived from 1,3-butadiene present in the polybutadiene is 25 to 40 mole percent and preferably 35 to 39 mole percent, with the proviso that the entirety of the monomer units (I), (II) and (III) add up to 100 mole percent and the polybutadiene has an average molecular weight of 1000 to 4000 g/mol, preferably 1200 to 3500 g/mol and preferably 1500 to 3000 g/mol, and preferably a viscosity at 20° C. of 2000 to 8000 mPa s, more preferably of 3000 to 7000 mPa s.

The acoustic damping material comprises 10 wt.-%, based on the total weight of the acoustic damping material, of at least one at 25° C. liquid rubber LR selected from the group consisting of at 25° C. liquid polybutenes and at 25° C. liquid polyisobutylenes, preferably at 25° C. liquid polyisobutylenes.

An amount of less than 10 wt.-% leads to insufficient ball drop test at low temperatures performance. This can be seen in the comparison of Ref.7 with E2 and E8.

Preferably, the amount of the at 25° C. liquid rubber LR is 12.5-35 wt.-%, preferably 14-30 wt.-%, preferably 15-25 wt.-%, most preferably 15-20 wt.-%, based on the total weight of the acoustic damping material. This is advantageous with respect to good ball drop test at low temperatures performance, high adhesion values and a cohesive fracture pattern. This can be seen in the comparison of Ref.7 with E2 and E8.

The term "at 25° C. liquid polybutene" preferably designates in the present disclosure olefin oligomers comprising isobutylene and/or 1-butene and/or 2-butene. The ratio of the $C_4$-olefin isomers can vary by manufacturer and by grade.

The term "at 25° C. liquid polyisobutylene" preferably designates in the present disclosure polyolefins and olefin oligomers of isobutylene, preferably containing at least 75%, more preferably at least 85% of repeat units derived from isobutylene.

Particularly suitable at 25° C. liquid polybutenes and polyisobutylenes have an average molecular weight of not more than 5000 g/mol, preferably not more than 3000 g/mol, more preferably not more than 2'500 g/mol, even more preferably not more than 2,000 g/mol, still more preferably not more than 1'500 g/mol.

Particularly suitable at 25° C. liquid polybutenes and polyisobutylenes have a polydispersity index (Mw/Mn) determined by gel permeation-chromatography (GPC) of not more than 7.5, more preferably not more than 5.0, such as in the range of 0.5-5.0, preferably 1.0-4.5, more preferably 1.0-3.5, even more preferably 1.25-2.5.

Liquid polybutenes are commercially available, for example, under the trade name of Indopol® H- and L-series (from Ineos Oligomers), under the trade name of Infineum® C-series and Parapol® series (from Infineum), and under the trade name of PB-series (Daelim). Liquid polyisobutylenes (PIBs) are commercially available, for example, under the trade name of Glissopal® V-series (from BASF) and under the trade name of Dynapak®-series (from Univar GmbH, Germany).

The acoustic damping material comprises 3 wt.-%, based on the total weight of the acoustic damping material, of at least one butyl rubber BR.

An amount of less than 3 wt.-% leads to insufficient ball drop test at low temperatures performance. This can be seen in the comparison of Ref.4 and Ref.6 with E2, E6 and E7.

Preferably, the amount of the at least one butyl rubber BR is 4.5-15 wt.-%, preferably 5-12 wt.-%, preferably 5.5-10 wt.-%, most preferably 6-8 wt.-%, based on the total weight of the acoustic damping material. This is advantageous with respect to good ball drop test at low temperatures performance, high adhesion values and a cohesive fracture pattern. This can be seen in the comparison of Ref.4-6 with E2 and E6-7.

The term "butyl rubber" designates in the present document a polymer derived from a monomer mixture containing a major portion of a $C_4$ to $C_7$ monoolefin monomer, preferably an isoolefin monomer and a minor portion, such as not more than 30 wt.-%, of a $C_4$ to $C_{14}$ multiolefin monomer, preferably a conjugated diolefin. The preferred $C_4$ to $C_7$ monoolefin monomer may be selected from the group consisting of isobutylene, 2-methyl-1-butene, 3-methyl-1-butene, 2-methyl-2-butene, 4-methyl-1-pentene, and mixtures thereof, preferably isobutylene.

The preferred $C_4$ to $C_{14}$ multiolefin comprises a $C_4$ to $C_{10}$ conjugated diolefin. The preferred $C_4$ to $C_{10}$ conjugated diolefin may be selected from the group comprising isoprene, butadiene, 2,4-dimethylbutadiene, piperyline, 3-methyl-1,3-pentadiene, 2,4-hexadiene, 2-neopentyl-1,3-butadiene, 2-methyl-1,5-hexadiene, 2,5-dimethyl-2,4-hexadiene, 2-methyl-1,4-pentadiene, 2-methyl-1,6-heptadiene, cyclopentadiene, methylcyclopentadiene, cyclohexadiene, 1-vinyl-cyclohexadiene and mixtures thereof, preferably isoprene.

Most preferably the butyl rubber BR is a polymer derived from isobutylene and isoprene.

Preferably, the at least one butyl rubber BR is selected from the group consisting of butyl rubber and halogenated butyl rubber, preferably butyl rubber, chlorobutyl rubber and bromobutyl rubber, more preferably butyl rubber and bromobutyl rubber, most preferably bromobutyl rubber.

Preferred butyl rubber BR have a Mooney viscosity (ML 1+8 at 125° C.) of 10-60 MU (Mooney units), preferably 20-50 MU, preferably 25-40 MU. Preferably, Mooney viscosity refers to the viscosity measure of rubbers. It is defined as the shearing torque resisting rotation of a cylindrical metal disk (or rotor) embedded in rubber within a cylindrical cavity. The dimensions of the shearing disk viscometer, test temperatures, and procedures for determining Mooney viscosity are defined in ASTM D1646.

The acoustic damping material comprises ≥3 wt.-%, based on the total weight of the acoustic damping material, of at least one natural or synthetic polyisoprene PI, preferably natural polyisoprene, most preferably natural rubber.

An amount of less than 3 wt.-% leads to insufficient ball drop test at low temperatures performance. This can be seen in the comparison of Ref.4 and Ref.6 with E2, E6 and E7.

Preferably, the amount of the at least one natural or synthetic polyisoprene PI is 4.5-15 wt.-%, preferably 5-12 wt.-%, preferably 5.5-10 wt.-%, most preferably 6-8 wt.-%, based on the total weight of the acoustic damping material. This is advantageous with respect to good ball drop test at low temperatures performance, high adhesion values and a cohesive fracture pattern. This can be seen in the comparison of Ref.4-6 with E2 and E6-7.

Preferably the at least one natural or synthetic polyisoprene PI has an average molecular weight of ≥100,000 g/mol, preferably 100,000-2,000,000 g/mol, more preferably 100,000-1,000,000 g/mol.

Natural rubber is a polymer of isoprene (methylbuta-1,3-diene) but is distinguished from synthetic polyisoprene which is the product of a metallic catalyst reaction.

Preferably, the natural or synthetic polyisoprene PI has a Mooney viscosity at 100° C. (ML 1+4) of from 30 to 120, more preferably from 40 to 65. The Mooney viscosity test referred to herein is in accordance with ASTM D-1646.

The acoustic damping material comprises 4-15 wt.-%, based on the total weight of the acoustic damping material, of at least one hydrocarbon resin HR.

Preferably, the amount of the at least one hydrocarbon resin HR is 5-12 wt.-%, preferably 5.5-10 wt.-%, most preferably 6.5-9.5 wt.-%, based on the total weight of the acoustic damping material. This is advantageous with respect to good ball drop test at low temperatures performance, high adhesion values and a cohesive fracture pattern. This can be seen in the comparison of Ref.8-9 with E2 and E9.

The term "hydrocarbon resin" preferably designates in the present document synthetic resins made by polymerizing mixtures of unsaturated monomers obtained from petroleum based feedstocks, such as by-products of cracking of natural gas liquids, gas oil, or petroleum naphthas. These types of hydrocarbon resins are also known as "petroleum resins" or as "petroleum hydrocarbon resins". The hydrocarbon resins include also pure monomer aromatic resins, which are prepared by polymerizing aromatic monomer feedstocks that have been purified to eliminate color causing contaminants and to precisely control the composition of the product.

Examples of suitable hydrocarbon resins to be used as the at least one hydrocarbon resin HR include C5 aliphatic resins, mixed C5/C9 aliphatic/aromatic resins, aromatic modified C5 aliphatic resins, cycloaliphatic resins, mixed C5 aliphatic/cycloaliphatic resins, mixed C9 aromatic/cycloaliphatic resins, mixed C5 aliphatic/cycloaliphatic/C9 aromatic resins, aromatic modified cycloaliphatic resins, C9 aromatic resins, as well hydrogenated versions of the aforementioned resins. The notations "C5" and "C9" indicate that the monomers from which the resins are made are predominantly hydrocarbons having 4-6 and 8-10 carbon atoms, respectively. The term "hydrogenated" includes fully, substantially and at least partially hydrogenated resins. Partially hydrogenated resins preferably have a hydrogenation level, for example, of 50%, 70%, or 90%.

The type of the at least one hydrocarbon resin HR is not particularly restricted in the present invention. The selection of the at least one hydrocarbon resin HR depends, at least partially, on the type of the other components contained in the binder matrix of the acoustic damping material, in particular of the type of the polymer component P.

Preferably, the at least one hydrocarbon resin HR has:

a softening point determined by using the Ring and Ball method as defined in DIN EN 1238 standard of at least 70° C., preferably at least 80° C., more preferably in the range of 70-180° C., preferably 80-150° C., more preferably 90-120° C. and/or, preferably and;

an average molecular weight (Mn) in the range of 250-7500 g/mol, preferably 300-5000 g/mol.

Suitable hydrocarbon resins are commercially available, for example, under the trade name of Wingtack® series, Wingtack® Plus, Wingtack® Extra, and Wingtack® STS (all from Cray Valley); under the trade name of Escorez® 1000 series, Escorez® 2000 series, and Escorez® 5000 series (all from Exxon Mobile Chemical); under the trade name of Novares® T series, Novares® TT series, Novares® TD series, Novares® TL series, Novares® TN series, Novares® TK series, and Novares® TV series (all from RUTGERS Novares GmbH); and under the trade name of Kristalex®, Plastolyn®, Piccotex®, Piccolastic® and Endex® (all from Eastman Chemicals).

The acoustic damping material comprises e) at least one solid particulate filler FM, preferably at least one solid particulate mineral filler FM.

Preferably, the acoustic damping material comprises 5-75 wt.-%, preferably 15-70 wt.-%, more preferably 25-65 wt.-%, even more preferably 35-65 wt.-%, still more preferably 40-65 wt.-% of the at least one solid particulate filler FM, based on the total weight of the acoustic damping material.

The at least one solid particulate filler FM is preferably present in the acoustic damping material in form of solid particles, preferably having a $d_{90}$ particle diameter of not more than 2.5 mm, more preferably not more than 1.5 mm. The term "particle diameter $d_{90}$" refers in the present disclosure to a particle diameter below which 90% of all particles by volume have a smaller diameter than the $d_{90}$ value. The term "particle diameter" refers in the present disclosure to the area-equivalent spherical diameter of a particle ($X_{area}$). The particle diameter distribution is preferably measured using dynamic image analysis method conducted according to ISO 13322-2:2006 standard. For determination of the particle diameter distribution, the particles are preferably dispersed in air, preferably using air pressure dispersion method. The measurements can be conducted using any type of dynamic image analysis apparatus, such as a Camsizer XT device (trademark of Retsch Technology GmbH).

It is also preferred that the at least one solid particulate filler FM is an inert mineral filler and has a water-solubility of less than 0.1 g/100 g water, more preferably less than 0.05 g/100 g water, even more preferably less than 0.01 g/100 g water, at a temperature of 20° C. The solubility of a compound in water can be measured as the saturation concentration, where adding more compound does not increase the concentration of the solution, i.e. where the excess amount of the substance begins to precipitate. The term "inert mineral filler" refers in the present disclosure to mineral fillers, which unlike mineral binders, are not reactive, i.e. do not undergo a hydration reaction in the presence of water.

According to one or more embodiments, the at least one solid particulate filler FM is selected from the group consisting of calcium carbonate, magnesium carbonate, calcium oxide, talc, kaolin, diatomaceous earth, wollastonite, feldspar, montmorillonite, dolomite, silica, preferably fumed silica, cristobalite, iron oxide, iron nickel oxide, strontium ferrite, barium-strontium ferrite, hollow ceramic spheres, hollow glass spheres, hollow organic spheres, glass spheres, mica, barium sulfate, and graphite.

The acoustic damping material may optionally contain additives, which are customary for acoustic damping materials. Examples of suitable additives include, for example, pigments, thixotropic agents, thermal stabilizers, drying agents, and flame retardants. These additives, if used at all, preferably comprise not more than 25 wt.-%, more preferably not more than 15 wt.-%, even more preferably not more than 10 wt.-%, of the total weight of the acoustic damping material.

A preferred acoustic damping material comprises 1-15 wt.-%, preferably 1.5-3 wt.-%, based on the total weight of the acoustic damping material, of the at least one polybutadiene PB;

12.5-35 wt.-%, preferably 15-20 wt.-%, based on the total weight of the acoustic damping material, of the at 25° C. liquid rubber LR;

4.5-15 wt.-%, preferably 6-8 wt.-%, based on the total weight of the acoustic damping material, of the at least one natural or synthetic polyisoprene PI;

4.5-15 wt.-%, preferably 6-8 wt.-%, based on the total weight of the acoustic damping material, of at least one butyl rubber BR;

5-12 wt.-%, preferably 5.5-10 wt.-%, most preferably 6.5-9.5 wt.-%, based on the total weight of the acoustic damping material, of at least one hydrocarbon resin HR; and 5-75 wt.-%, preferably 40-65 wt.-%, of the at least one solid particulate filler FM, based on the total weight of the acoustic damping material.

Another subject of the present invention is a method for producing an acoustic damping material according to the present invention, the method comprising mixing the components a) to f) with each other at an elevated temperature, preferably at a temperature in the range of 120-200° C., more preferably 130-180° C., until a homogeneously mixed mixture is obtained.

The term "homogeneously mixed mixture" refers in the present document to compositions, in which the individual constituents are distributed substantially homogeneously in the composition. Furthermore, a homogeneously mixed mixture is preferably a multi-phase mixture. For a person skilled in the art it is clear that within such mixed compositions there may be regions formed, which have a slightly higher concentration of one of the constituents than other regions and that a 100% homogeneous distribution of all the constituents is generally not achievable. Such mixed compositions with "imperfect" distribution of constituents, however, are also intended to be included by the term "homogeneously mixed mixture" in accordance with the present invention.

Any conventional type of a mixing apparatus can be used in mixing of the components a) to f) with each other. The mixing step can be conducted as a batch process using a batch-type mixer, such as a Brabender, a Banbury, a roll mixer or as a continuous process using a continuous-type mixer, such as an extruder, in particular a single- or a twin-screw extruder.

The homogeneously mixed mixture obtained from the mixing step can be subsequently cooled to a temperature of below 100° C., more preferably of below 80° C. In case an extruder apparatus is used in the mixing step, the homogeneously mixed mixture is preferably extruded through an extruder die before the cooling step. The cooled homogeneously mixed mixture is storage stable at normal storage conditions. The term "storage stable" refers in the present disclosure to materials, which can be stored at specified storage conditions for long periods of time, such as at least one month, in particular at least 3 months, without any significant changes in the application properties of the material. The "typical storage conditions" refer to temperatures of not more than 60° C., in particular not more than 50° C.

The homogeneously mixed mixture can furthermore be processed into a form of a shaped article, such as a sheet or a film by using any conventional techniques, such as extrusion, calendaring, and hot-pressing techniques. The shaping step is preferably conducted before the cooling step. According to one or more embodiments, the homogeneously mixed mixture is extruded through a flat die to form a sheet of film, which is preferably cooled between a pair of calender cooling rolls. Shaped articles having specific dimensions can be produced from the extruded sheet of film, for example, by punch or die cutting.

Another subject of the present invention is use of the acoustic damping material according to the present invention for damping of vibrations and/or noise in transportation vehicles or white goods.

Another subject of the present invention is a vibration and noise damping element (1) comprising:

i) A damping layer (2) having a first and a second surface (3, 3') and ii) An adhesive layer (4) covering at least a portion of the first surface (3) of the damping layer (2), wherein the adhesive layer (4) comprises or is composed of the acoustic damping material of the present invention.

A cross-section of the vibration and noise damping element according to the present invention is shown in FIG. 1.

According to one or more embodiments, the damping layer is sheet-like element having a first and a second major surfaces defining a thickness there between and a length and width at least 5 times, preferably at least 15 times, more preferably at least 25 times greater than the thickness of the sheet-like element. The term "thickness" preferably refers to a dimension of a sheet-like element that is measured in a plane that is perpendicular to the length and width dimensions of the element. In embodiments, in which the damping layer is sheet-like element, the first and second surfaces of the damping layer correspond to the first and second major surfaces of a sheet-like element.

The damping layer and the adhesive layer are preferably directly connected to each other over their opposing surfaces. The expression "directly connected" is understood to mean in the context of the present invention that no further layer or substance is present between the two layers and that the opposing surfaces of the layers are directly adhered to each other. According to one or more embodiments, the adhesive layer covers at least 50%, preferably at least 65%, more preferably at least 75% of the first surface of the damping layer.

According to one or more further embodiments, the adhesive layer covers substantially the entire area of the first surface of the damping layer. The expression "substantially entire area" is understood to mean at least 90%, preferably at least 95%, more preferably at least 98.5% of the total area.

The damping layer preferably comprises a component selected from the list of bitumen component B, thermoplastic polymer component P and rubber component Ru, preferably rubber component Ru.

Preferred rubber components Ru are selected from the list of at 25° C. liquid rubber LR selected from the group consisting of at 25° C. liquid polybutenes and at 25° C. liquid polyisobutylenes, butyl rubber BR, natural or synthetic polyisoprene PI, nitrile rubber NBR, ethylene-propylene terpolymer EPDM, ethylene-propylene copolymer EPM and chloroprene rubber CR, preferably selected from the list of at 25° C. liquid rubber LR selected from the group consisting of at 25° C. liquid polybutenes and at 25° C. liquid polyisobutylenes, butyl rubber BR and natural or synthetic polyisoprene PI.

The bitumen component B can comprise one of more different types of bitumen materials, such as penetration grade (distillation) bitumen, air-rectified (semi-blown) bitumen, and hard grade bitumen.

The term "bitumen" designates in the present disclosure blends of heavy hydrocarbons, having a solid consistency at room temperature. These are normally obtained as vacuum residue from refinery processes, which can be distillation (topping or vacuum) and/or conversion processes, such as thermal cracking and visbreaking, of suitable crude oils. Furthermore, the term "bitumen" also designates natural and synthetic bitumen as well as bituminous materials obtained from the extraction of tars and bituminous sands.

The term "penetration grade bitumen" refers here to bitumen obtained from fractional distillation of crude oil. A heavy fraction composed of high molecular weight hydrocarbons, also known as long residue, which is obtained after removal of gasoline, kerosene, and gas oil fractions, is first distilled in a vacuum distillation column to produce more gas oil, distillates, and a short residue. The short residue is then used as a feed stock for producing different grades of bitumen classified by their penetration index, typically defined by a PEN value, which is the distance in tenth millimeters (dmm) that a needle penetrates the bitumen under a standard test method. Penetration grade bitumen are characterized by penetration and softening point. The term "air-rectified bitumen" or "air-refined bitumen" refers in the present disclosure to a bitumen that has been subjected to mild oxidation with the goal of producing a bitumen that meets paving-grade bitumen specifications. The term "hard grade bitumen" refers in the present disclosure to bitumen produced using extended vacuum distillation with some air rectification from propane-precipitated bitumen. Hard bitumen typically have low penetration values and high softening-points.

According to one or more embodiments, the bitumen component B comprises at least 75 wt.-%, preferably at least 85 wt.-%, more preferably at least 90 wt.-% of at least one penetration grade bitumen, preferably having a penetration value in the range of 15-50 dmm, more preferably 20-45 dmm and/or a softening point determined by Ring and Ball measurement conducted according to DIN EN 1238 standard in the range of 40-125° C., preferably 50-100° C.

Preferred thermoplastic polymer component P are selected such that the temperature range at which the maximum vibration damping effect of the acoustic damping material occurs coincides with the range of temperatures to which the surface of a substrate to be damped against vibrations is subjected during its use. Since the ability of polymers to dissipate vibrations to heat energy is at maximum when the polymer is in a transition state between the hard/glassy and soft/rubbery state, preferred thermoplastic polymers P to be used in the acoustic damping material have a glass transition temperature ($T_g$) falling within the intended range of application temperatures. For example, in case the acoustic damping material is used for damping of vibrations and noise in structures of automotive vehicles, the application temperatures typically range from −40° C. to 60° C., in particular from −35° C. to 50° C. On the other hand, preferred thermoplastic polymers P to be used in the acoustic damping material have a softening point ($T_s$) and/or a melting temperature ($T_m$) above the maximum application temperature of the acoustic damping material.

According to one or more embodiments, the thermoplastic polymer P has:

a glass transition temperature ($T_g$) determined by dynamical mechanical analysis (DMA) as the peak of the measured loss modulus (G") curve using an applied frequency of 1 Hz and a strain level of 0.1% of below 25° C., preferably below 5° C., more preferably below 0° C. and/or a softening point ($T_s$) determined by Ring and Ball measurement conducted according to DIN EN 1238 standard of above 35° C., preferably above 45° C., more preferably above 55° C., such as in the range of 35-250° C., preferably 45-200° C., more preferably 55-180° C.

The type of the thermoplastic polymer P is not particularly restricted. Various types of thermoplastic polymers, including crystalline, semi-crystalline, and amorphous polymers and thermoplastic elastomers are suitable for use as the at least one thermoplastic polymer P. Suitable thermoplastic polymers P include, in particular, polyolefin homopolymers and copolymers, copolymers of ethylene with vinyl acetate, and thermoplastic olefin elastomers (TPE-O).

More preferably, the damping layer preferably comprises 10-18 wt.-%, based on the total weight of the damping layer, of at least one at 25° C. liquid rubber LR selected from the group consisting of at 25° C. liquid polybutenes and at 25° C. liquid polyisobutylenes, preferably at 25° C. liquid polyisobutylenes;

2-5 wt.-%, based on the total weight of the damping layer, of at least one butyl rubber BR;

0.5-3 wt.-%, based on the total weight of the damping layer, of at least one natural or synthetic polyisoprene PI, preferably natural polyisoprene, most preferably natural rubber;

5-10 wt.-%, based on the total weight of the damping layer, of at least one hydrocarbon resin HR;

50-80 wt.-%, based on the total weight of the damping layer, of at least one solid particulate filler FM.

Preferred at 25° C. liquid rubber LR selected from the group consisting of at 25° C. liquid polybutenes and at 25° C. liquid polyisobutylenes, butyl rubber BR, natural or synthetic polyisoprene PI, hydrocarbon resin HR and solid particulate filler FM are the ones that were indicated as preferred for the composition of the acoustic damping material before.

According to one or more embodiments, the damping layer has a maximum thickness in the range of 0.5-10 mm, preferably 0.5-7 mm, more preferably 0.5-5 mm, even more preferably 0.5-3 mm and/or a density in the range of 1-4 g/cm$^3$, preferably 1-3 g/cm$^3$, more preferably 1-2 g/cm$^3$ and/or a mass per unit area of 1-5 kg/m$^2$, preferably 1-4.5 kg/m$^2$, more preferably 1.5-4.5 kg/m$^2$, still more preferably 1.5-3.5 kg/m$^2$.

The adhesive layer 4 comprises or preferably is composed of the acoustic damping material of the present invention. The preferred embodiments for the acoustic damping material described before also apply to the acoustic damping material in the adhesive layer 4.

According to one or more embodiments, the adhesive layer has a maximum thickness in the range of 0.5-5 mm, preferably 0.5-3 mm, more preferably 0.5-2 mm, even more preferably 0.5-1 mm and/or a density in the range of 1-4 g/cm$^3$, preferably 1-3 g/cm$^3$, more preferably 1-2 g/cm$^3$ and/or a mass per unit area of 0.5-5 kg/m$^2$, preferably 0.6-4 kg/m$^2$, more preferably 0.7-3 kg/m$^2$.

Preferred sizes for the vibration and noise damping element are elements that are 20-1000 mm, more preferred 50-500 mm, most preferred 100-400 mm in length and in width.

Preferably, the vibration and noise damping element has the following properties:

Temperature at which the maximum loss factor is measured (T @LF$_{max}$) is between 5° C. or 25° C., preferably between 15° C. or 25° C.

Value of the maximum loss factor (LF$_{max}$) is ≥0.3, preferably ≥0.35, preferably ≥0.39, preferably ≥0.40, most preferably ≥0.41.

Preferably, the loss factor is determined by using the measurement method as defined in ISO 6721 standard, more preferably as described in the experimental section.

Figure 2:
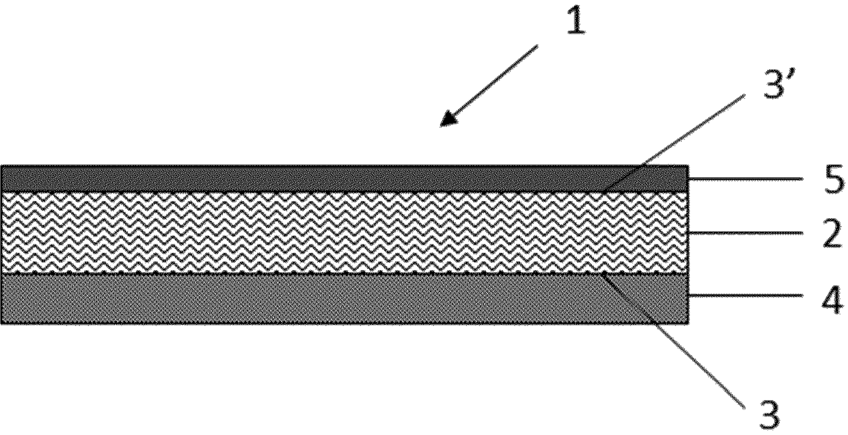
FIG. 2 shows a cross-section of a vibration and noise damping element (1) comprising a damping layer (2) having a first (3) surface and a second surface (3'), an adhesive layer (4) covering the first surface (3) of the damping layer (2), and a constrained layer (5) covering the second surface (3') of the damping layer (2).

According to one or more embodiments, the vibration and noise damping element further comprises, in addition to the damping layer and the adhesive layer, a constrained layer covering at least a portion of the second surface of the damping layer. The vibration and noise damping element according to these embodiments are generally known as "constrained layer dampers". The damping layer and the constrained layer are preferably directly connected to each other over their opposing surfaces, preferably the damping layer is sandwiched between the adhesive layer and the constrained layer. According to one or more embodiments, the constrained layer covers substantially, preferably completely, the entire area of the second surface of the damping layer. A cross-section of a vibration and noise damping element according to these embodiments is shown in FIG. 2.

According to one or more embodiments, the constrained layer is a metal sheet, preferably aluminum or steel sheet or a polymeric sheets, preferably glass fiber reinforced polymer sheet. The thickness of the constrained layer is not particularly restricted but the use of constrained layers that are thinner than the damping layer is generally preferred. Preferred thickness also depends on the material of the constrained layer. According to one or more embodiments, the constrained layer has a thickness of 0.05-1.5 mm, preferably 0.1-1.25 mm, more preferably 0.1-1.0 mm. According to one or more embodiments, the constrained layer is a metal sheet having a thickness of 0.05-0.5 mm, preferably 0.05-0.4 mm. According to one or more further embodiments, the constrained layer is a polymeric sheet having a thickness of 0.1-1.2 mm, preferably 0.25-1.0 mm.

It is preferred that the constrained layer has an elastic modulus, which is larger than that of the damping layer, such larger by at least the factor 3, preferably at least the factor 5, more preferably at least a factor of 10, wherein the elastic modulus is measured by using the method as defined in ISO 6892-1:2016 standard (for metallic sheets) or as defined in ISO 527-2 standard (for polymeric sheets).

According to a preferred embodiment, the vibration and noise damping element consists of a damping layer, an adhesive layer and a constrained layer.

Another subject of the present invention is a method for producing a vibration and noise damping element of the present invention, the method comprising steps of:

i) Providing a damping layer having a first and a second surface, ii) Applying an adhesive composition comprising or composed of the acoustic damping material of the present invention on the first surface of the damping layer.

Step i) can be conducted by any conventional techniques known to a person skilled in the art. For example, the acoustic damping material can be first melt-processed in an extruder apparatus and then extruded though an extruder die, preferably a flat die, into a form of a damping layer. Alternatively, the acoustic damping material of the present invention can be processed into a damping layer by using calendering or hot-pressing techniques.

Step ii) can be conducted by any conventional techniques known to a person skilled in the art. The adhesive composition can be applied on the surface of the damping layer using any conventional techniques. For example, the adhesive composition can be applied on the surface of the sheet by nozzle extrusion, powder dispersion, calendaring, or by spray lamination techniques, preferably by calendaring.

Another subject of the present invention is a method for applying a vibration and noise damping element according to the present invention to a noise emitting surface of a substrate, the method comprising steps of:

I) Providing a vibration and noise damping element according to the present invention, II) Contacting the outer major surface of the adhesive layer of the vibration and noise damping element with the noise emitting surface and applying sufficient pressure to form an adhesive bond or II') Heating the adhesive layer and/or the substrate and contacting the outer major surface of the adhesive layer with the noise emitting surface and forming an adhesive bond by cooling of the adhesive layer.

The term "outer major surface" of the adhesive layer refers to the major surface of the adhesive layer on the side opposite to the side of the damping layer. The substrate having a noise emitting surface can be any type of shaped article, such as a panel, a sheet, or a film, composed, for example, of metal, plastic, or fiber reinforced plastic. The heating of the adhesive layer and/or the substrate in step II)' can be conducted using any conventional techniques, such as heating in an oven, heating by air stream, or heating with infrared (IR)-radiation.

Figure 3:
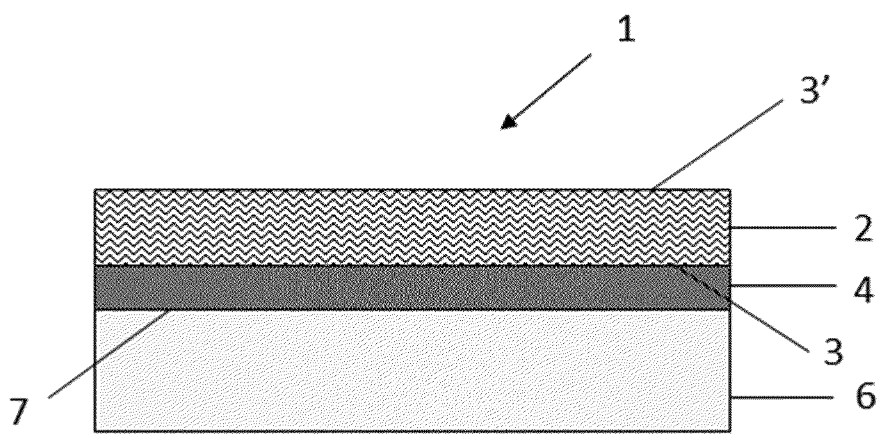
FIG. 3 shows a cross-section of a vibration damped system comprising a substrate (6) having a noise emitting surface (7) and a vibration and noise damping element (1) comprising a damping layer (2) and an adhesive layer (4), wherein the first surface (3) of the damping layer (2) is adhesively bonded to the noise emitting surface (7) via the adhesive layer (4).

Still another subject of the present invention is a vibration damped system comprising a substrate (6) having a noise emitting surface (7) and a vibration and noise damping element (1) according to the present invention, wherein least a portion of the first surface (3) of the damping layer (2) is adhesively bonded to the noise emitting surface (7) via the adhesive layer (4). A cross-section of a vibration damped system is shown in FIG. 3.

Figure 4:
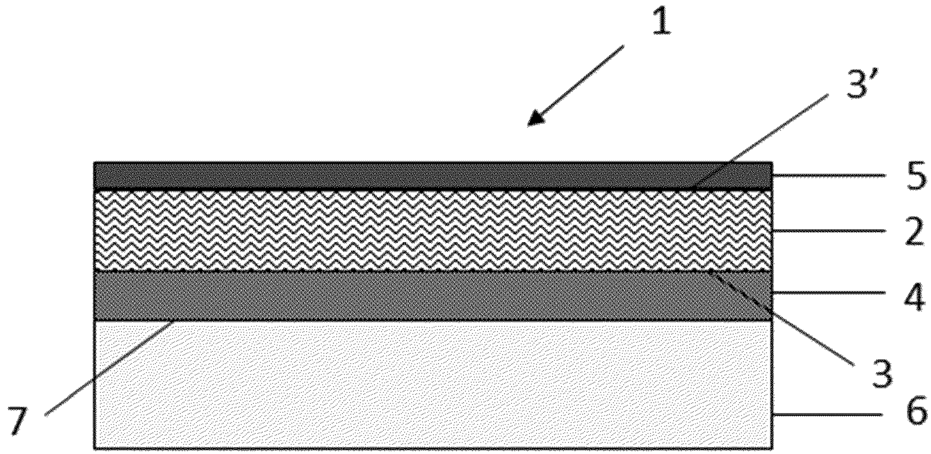
FIG. 4 shows a cross-section of a vibration damped system comprising a substrate (6) having a noise emitting surface (7) and a vibration and noise damping element (1) comprising a damping layer (2), an adhesive layer (4), and a constrained layer (5), wherein the first surface (3) of the damping layer (2) is adhesively bonded to the noise emitting surface (7) via the adhesive layer (4) and wherein the damping layer (2) is sandwiched between the adhesive layer (4) and the constrained layer (5).

According to one or more embodiments, the vibration and noise damping element (1) is a constrained damping element comprising a constrained layer (5), wherein the damping layer (2) is sandwiched between the adhesive layer (4) and a constrained layer (5). A cross-section of a vibration damped system according to these embodiments is shown in FIG. 4.

According to one or more embodiments, the substrate having the noise emitting surface is part of a structure of an automotive vehicle or a white good.

EXAMPLES

The raw materials shown in Table 1 were used in the compositions for the adhesive layer as shown in the tables 3 and 4, respectively for the damping layer as shown in table 2.

TABLE 1

| | |
|---|---|
| PB-Ref. 1 | Polyvest 110, Viscosity @ 20° C. 700-860 mPa * s, Mn = 2600 g/mol, (I) 1%, (II) 24%, (III) 75%, Evonik |
| PB-Ref. 2 | Polyvest 130, Viscosity @ 20° C. 2700-3300 mPa * s, Mn = 4600 g/mol, (I) 1%, (II) 22%, (III) 77%, Evonik |
| PB | Polyvest EP MV, Viscosity @ 20° C. = 5'000-7'000 mPa * s, Mn = 1'700-2'700 g/mol, Tg −65° C., units of the formula (I) 61%, formula (II) 2%, formula (III) 37%, Evonik |
| LR | PIB 32, at 25° C. liquid synthetic polyisobutylene, Mn: 1300 g/mol, Braskem |
| PI | Natural rubber, Mooney viscosity: 50 +/− 5 MU (ML (1 + 4) 100° C.) |
| BR | Brominated isobutylene-isoprene copolymer, X Butyl BB 2030, Mooney viscosity: 32 +/− 4 MU (ML (1 + 8) 125° C.), Arlanxeo |
| HR | Wingtack 95, Hydrocarbon resin, Softening Point: 98° C., Mn: 1,700 g/mol, Cray Valley |
| Calcit | Calcit |
| HDK | HDK, fumed silica, Wacker |
| CaO | Calcium oxide |
| Pigment | Carbon black |
| Antioxidant | Sterically hindered phenolic primary antioxidant |
| P | At 25° C. solid amorphous poly-α-olefin |

Preparation of the Compositions

The inventive acoustic damping materials of the examples Ex-1 to Ex-6 as well as the reference examples Ref.1 to Ref.9 shown in table 3 and table 4 used in the adhesive layer were prepared according to the following procedure.

In a first step, the components BR, PI, HR and a half of the calcit were mixed in a batch type mixer. After that, the remaining raw materials was added constantly over a time of 1 hour and mixed during 20 min. The mixed compositions were then stored in unsealed drums and used immediately after mixing.

In a second step, the components for the damping layer composition were mixed with following components as shown in table 2:

TABLE 2

| Components | Wt.-% |
|---|---|
| LR | 14 |
| PI | 1.5 |
| BR | 3.0 |
| HR | 7.0 |
| P | 4.5 |
| Calcit | 66.3 |
| HDK | 0.4 |
| CaO | 2.9 |
| Pigment | 0.2 |
| Antioxidant | 0.2 |
| Total wt.-% | 100 |

BR, PI, HR and a half of the calcit were mixed in a batch type mixer. After that, the remaining raw materials was added constantly over a time of 1 hour and mixed during 20 min. The mixed damping layer composition was then stored in unsealed drums and used immediately after mixing.

For the following tests, test samples (vibration and noise damping elements) were produced with an adhesive layer of a thickness of 0.6 mm consisting of compositions Ex-1 to Ex-6, respectively reference examples Ref.1 to Ref.9. On top of this adhesive layer, a damping layer of a thickness of 1.1 mm of the above mentioned damping layer composition was added. On top of the damping layer, an aluminium layer (constrained layer) of a thickness of 0.3 mm was added. The test results are shown in table 3 and table 4.

Measurement of Resistance to High Temperatures ("Resistance ht")

The heat resistance test at 210° C. was performed according to the BMW group standard, Adhesives and sealing materials used in the body shop Damping pad, Requirements and testings, GS 97028-16:2012-02 page 4, table 1: Resistance to high temperature ("Wärmetest"), AA-0415, edition 2018-10. The test samples had a length/width of 16 cm×7 cm.

Grading System:

There should be no blistering, no dissolution, no slipping and no shrinkage in order to obtain the grade=OK.

Measurement/Determination Adhesion at Low Temperatures by the Ball Drop Test at −30° C. ("Bdt −30° C.")

The ball drop test at −30° C. was performed according to the Volkswagen group standard, quality requirements, self-adhesive stiffening pads and sound deadening pads, QP M052 page 12, point 3.7.5 Ball drop test/determination of cold adhesion ("Kugelfall/Bestimmung der Kältehaftung"), PV 3971, edition 2020-03. The test samples had a length/width of 7 cm×7 cm.

Grading System:

Grade 1: No cracking or splintering of the specimens, no chippings from the test sheet Grade 2: Cracking or splintering of the specimens, but no chippings from the test sheet Grade 3: No chipping from the test sheet; however, specimens can be delaminated from the test sheet by means of small bending loads Grade 4: Cracking or splintering of the specimens, partial chipping from the test sheet Grade 5: Cracking or splintering of the specimens, large-scale chipping from the test sheet Grade 6: Complete delamination from the test sheet Measurement of the Adhesion/Peel Strength ("Peel Strength")

The peel strength test was performed according to the BMW group standard, Adhesives and sealing materials used in the body shop Damping pad, Requirements and testing, GS 97028-16:2012-02 page 4, table 1: Adhesion ("Peel-resistance of sound deadening and stiffening materials in the body shop"), AA-0007, edition 2018-10. The test samples had a length/width of 20 cm×3 cm. In addition, the fracture pattern was visually analyzed.

Grading System:

on oiled steel after 30 min room temperature: >1.5 N/cm on oiled steel after 30 min 195° C.: >4 N/cm Measurement of the Loss Factor ("Loss Factor")

The loss factors for the test specimen were determined by using the measurement method as defined in ISO 6721 standard. The measurements were conducted at 200 Hz anti-resonance point and at a temperature range of 20 to 60° C. using a commercially available loss factor tester. The test samples had a length/width of 20 cm×1 cm.

It is advantageous if the highest value of the loss factor in table 1 and table 2 is measured at 10° C. or 20° C., preferably 20° C., because this temperature is the most common operating temperature in a vehicle.

TABLE 3

| Composition adhesive layer | Ref. 1 | Ref. 2 | Ref. 3 | E1 | E2 | E3 | E4 | E5 |
|---|---|---|---|---|---|---|---|---|
| PB-Ref. 1 | 2 | | | | | | | |
| PB-Ref. 2 | | 2 | | | | | | |
| PB | | | 0.25 | 1 | 2 | 4 | 6 | 8 |
| LR | 16 | 16 | 16 | 16 | 16 | 16 | 16 | 16 |
| PI | 6.4 | 6.4 | 6.4 | 6.4 | 6.4 | 6.4 | 6.4 | 6.4 |
| BR | 6.8 | 6.8 | 6.8 | 6.8 | 6.8 | 6.8 | 6.8 | 6.8 |
| HR | 8.5 | 8.5 | 8.5 | 8.5 | 8.5 | 8.5 | 8.5 | 8.5 |
| Calcit | 58.6 | 58.6 | 58.35 | 57.6 | 56.6 | 54.6 | 52.6 | 50.6 |
| HDK | 0.4 | 0.4 | 0.4 | 0.4 | 0.4 | 0.4 | 0.4 | 0.4 |
| CaO | 2.9 | 2.9 | 2.9 | 2.9 | 2.9 | 2.9 | 2.9 | 2.9 |
| Pigment | 0.2 | 0.2 | 0.2 | 0.2 | 0.2 | 0.2 | 0.2 | 0.2 |
| Antioxidant | 0.2 | 0.2 | 0.2 | 0.2 | 0.2 | 0.2 | 0.2 | 0.2 |
| Total wt.-% | 100 | 100 | 100 | 100 | 100 | 100 | 100 | 100 |
| Resistance ht | OK | OK | OK | OK | OK | OK | OK | OK |
| Bdt −30° C. | 4/4 | 4/4 | 5/5 | 3/3 | 1/1 | 1/1 | 1/1 | 1/1 |
| Peel strength [N/cm] | 9.3 | 9.7 | 10.2 | 10.5 | 10.1 | 9.5 | 9.8 | 9.4 |
| Loss factor | | | | | | | | |
| 30° C. | 0.281 | 0.32 | 0.308 | 0.304 | 0.331 | 0.279 | 0.216 | 0.184 |
| 20° C. | 0.379 | 0.394 | 0.381 | 0.396 | 0.417 | 0.408 | 0.367 | 0.302 |
| 10° C. | 0.353 | 0.322 | 0.309 | 0.335 | 0.344 | 0.384 | 0.430 | 0.400 |
| 0° C. | 0.219 | 0.174 | 0.163 | 0.187 | 0.191 | 0.224 | 0.288 | 0.303 |
| Fracture pattern | 50% cf | 50% cf | 50% cf | 75% cf | 100% cf | 100% cf | 75% cf | 50% cf |

cf = cohesive failure

TABLE 4

| Composition adhesive layer | Ref. 4 | Ref. 5 | Ref. 6 | E6 | E7 | Ref. 7 | E8 | Ref. 8 | E9 | Ref. 9 |
|---|---|---|---|---|---|---|---|---|---|---|
| PB-Ref. 1 | | | | | | | | | | |
| PB-Ref. 2 | | | | | | | | | | |
| PB | 2 | 2 | 2 | 2 | 2 | 2 | 2 | 2 | 2 | 2 |
| LR | 16 | 16 | 16 | 16 | 16 | 8 | 24 | 16 | 16 | 16 |

TABLE 4-continued

| Composition adhesive layer | Ref. 4 | Ref. 5 | Ref. 6 | E6 | E7 | Ref. 7 | E8 | Ref. 8 | E9 | Ref. 9 |
|---|---|---|---|---|---|---|---|---|---|---|
| PI | 13.2 | 0 | 2 | 8 | 12 | 6.4 | 6.4 | 6.4 | 6.4 | 6.4 |
| BR | 0 | 13.2 | 2 | 8 | 12 | 6.8 | 6.8 | 6.8 | 6.8 | 6.8 |
| HR | 8.5 | 8.5 | 8.5 | 8.5 | 8.5 | 8.5 | 8.5 | 3 | 6 | 18 |
| Calcit | 56.6 | 56.6 | 65.8 | 53.8 | 45.8 | 64.6 | 48.6 | 62.1 | 59.1 | 47.1 |
| HDK | 0.4 | 0.4 | 0.4 | 0.4 | 0.4 | 0.4 | 0.4 | 0.4 | 0.4 | 0.4 |
| CaO | 2.9 | 2.9 | 2.9 | 2.9 | 2.9 | 2.9 | 2.9 | 2.9 | 2.9 | 2.9 |
| Pigment | 0.2 | 0.2 | 0.2 | 0.2 | 0.2 | 0.2 | 0.2 | 0.2 | 0.2 | 0.2 |
| Antioxidant | 0.2 | 0.2 | 0.2 | 0.2 | 0.2 | 0.2 | 0.2 | 0.2 | 0.2 | 0.2 |
| Total wt.-% | 100 | 100 | 100 | 100 | 100 | 100 | 100 | 100 | 100 | 100 |
| Resistance ht | OK | OK | OK | OK | OK | OK | OK | OK | OK | OK |
| Bdt −30° C. | 5/5 | 6/6 | 6/6 | 1/1 | 1/1 | 3/5 | 1/1 | 5/5 | 1/1 | 5/5 |
| Peel strength [N/cm] | 7.1 | 15.2 | 6.9 | 11.7 | 11.5 | 5.1 | 12.7 | 8 | 10.2 | 12.7 |
| Loss factor | | | | | | | | | | |
| 30° C. | 0.226 | 0.435 | 0.364 | 0.273 | 0.244 | 0.324 | 0.243 | 0.269 | 0.295 | 0.303 |
| 20° C. | 0.338 | 0.440 | 0.434 | 0.392 | 0.35 | 0.373 | 0.387 | 0.334 | 0.375 | 0.495 |
| 10° C. | 0.392 | 0.268 | 0.279 | 0.367 | 0.386 | 0.267 | 0.422 | 0.314 | 0.336 | 0.331 |
| 0° C. | 0.292 | 0.130 | 0.134 | 0.24 | 0.28 | 0.152 | 0.267 | 0.208 | 0.215 | 0.18 |
| Fracture pattern | 100% cf | af | 25% cf | 100% cf | 100% cf | af | 100% cf | af | af | 100% cf |

cf = cohesive failure,
af. = purely adhesive failure

The invention claimed is:

1. An acoustic damping material comprising:

a) ≥0.75 wt.-%, based on the total weight of the acoustic damping material, of at least one polybutadiene PB comprising monomer units derived from 1,3-butadiene (I)

(II)

; and (III)

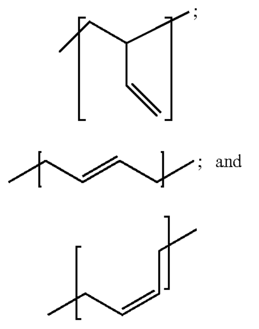

wherein the proportion of monomer units of the formula (I) in the entirety of the monomer units derived from 1,3-butadiene present in the polybutadiene is 25 to 75 mole percent, the proportion of units of the formula (II) in the entirety of the monomer units derived from 1,3-butadiene present in the polybutadiene is 0 to 10 mole percent and the proportion of monomer units of the formula (III) in the entirety of the monomer units derived from 1,3-butadiene present in the polybutadiene is 25 to 75 mole percent, wherein the entirety of the monomer units (I), (II) and (III) add up to 100 mole percent;

b) ≥10 wt.-%, based on the total weight of the acoustic damping material, of at least one at 25° C. liquid rubber LR selected from the group consisting of at 25° C. liquid polybutenes and at 25° C. liquid polyisobutylenes;

c) ≥3 wt.-%, based on the total weight of the acoustic damping material, of at least one butyl rubber BR;

d) ≥3 wt.-%, based on the total weight of the acoustic damping material, of at least one natural or synthetic polyisoprene PI;

e) 4-15 wt.-%, based on the total weight of the acoustic damping material, of at least one hydrocarbon resin HR;

f) at least one solid particulate filler FM.

2. The acoustic damping material according to claim 1, wherein of the at least one polybutadiene PB, the proportion of units of the formula (I) in the entirety of the monomer units derived from 1,3-butadiene present in the polybutadiene is 50 to 65 mole percent, the proportion of units of the formula (II) in the entirety of the monomer units derived from 1,3-butadiene present in the polybutadiene is 1 to 8 mole percent, and the proportion of units of the formula (III) in the entirety of the monomer units derived from 1,3-butadiene present in the polybutadiene is 25 to 40 mole percent, with the proviso that the entirety of all monomer units (I), (II) and (III) add up to 100 mole percent, and the polybutadiene has an average molecular weight of 1200 to 3500 g/mol.

3. The acoustic damping material according to claim 1, wherein the amount of the at least one polybutadiene PB is 1-15 wt.-%, based on the total weight of the acoustic damping material.

4. The acoustic damping material according to claim 1, wherein the amount of the at 25° C. liquid rubber LR is 12.5-35 wt.-%, based on the total weight of the acoustic damping material.

5. The acoustic damping material according to claim 1, wherein the amount of the at least one natural or synthetic polyisoprene PI is 4.5-15 wt.-%, based on the total weight of the acoustic damping material.

6. The acoustic damping material according to claim 1, wherein the amount of the at least one butyl rubber BR is 4.5-15 wt.-%, based on the total weight of the acoustic damping material.

7. The acoustic damping material according to claim 1, wherein the amount of the at least one hydrocarbon resin HR is 5-12 wt.-%, based on the total weight of the acoustic damping material.

8. The acoustic damping material according to claim 1, wherein the at least one at 25° C. liquid rubber LR has an average molecular weight of not more than 5,000 g/mol.

9. The acoustic damping material according to claim 1, wherein the at least one butyl rubber BR has a Mooney viscosity (ML 1+8 at 125° C.) of 10-60 MU (Mooney units).

10. The acoustic damping material according to claim 1, wherein the at least one natural or synthetic polyisoprene PI has a Mooney viscosity at 100° C. (ML 1+4) of from 30 to 120.

11. A method comprising a step of damping vibrations and/or noise in transportation vehicles or white goods with the acoustic damping material according to claim 1.

12. A vibration and noise damping element comprising:

i) A damping layer having a first surface and a second surface and ii) An adhesive layer covering at least a portion of the first surface of the damping layer, wherein the adhesive layer comprises the acoustic damping material according to claim 1.

13. The vibration and noise damping element according to claim 12, wherein the adhesive layer has a thickness of 0.5-5 mm mm and/or a mass per unit area of 0.5-5 kg/$m^2$.

14. A method for applying the vibration and noise damping element according to claim 12 to a noise emitting surface of a substrate, the method comprising steps of:

I) Providing the vibration and noise damping element according to claim 12,

II) Contacting the outer major surface of the adhesive layer of said vibration and noise damping element with the noise emitting surface and applying sufficient pressure to form an adhesive bond or II') Heating the adhesive layer and/or the substrate and contacting the outer major surface of the adhesive layer with the noise emitting surface and forming an adhesive bond by cooling of the adhesive layer.

15. A vibration damped system comprising a substrate having a noise emitting surface and the vibration and noise damping element according to claim 12, wherein at least a portion of the first surface of the damping layer is adhesively bonded to the noise emitting surface via the adhesive layer.

* * * * *